United States Patent
Dudinetz et al.

(10) Patent No.: US 6,273,429 B1
(45) Date of Patent: Aug. 14, 2001

(54) LABYRINTH CARTRIDGE SEAL, AND CENTRIFUGAL COMPRESSOR APPLICATIONS THEREOF

(75) Inventors: Michael J. Dudinetz, Saratoga Springs; Kenneth W. Streifert, Scotia; Ralph F. Hubert, Cohoes, all of NY (US)

(73) Assignee: Atlas Copco Aktiebolag, Stockholm (SE)

( * ) Notice: Subject to any disclaimer, the term of this patent is extended or adjusted under 35 U.S.C. 154(b) by 0 days.

(21) Appl. No.: 09/112,674

(22) Filed: Jul. 9, 1998

(51) Int. Cl.[7] .................................................. F16J 15/447
(52) U.S. Cl. .......................... 277/418; 277/419; 277/585
(58) Field of Search ..................................... 277/409, 412, 277/418, 419, 421, 371, 361, 365, 375, 422, 585; 415/230

(56) References Cited

U.S. PATENT DOCUMENTS

| | | |
|---|---|---|
| 2,356,011 * | 8/1944 | Sheldon . |
| 3,053,541 * | 9/1962 | Dega ..................................... 277/427 |
| 3,503,616 * | 3/1970 | Hickey . |
| 4,017,127 * | 4/1977 | Smith et al. ........................... 308/23 |
| 4,139,204 * | 2/1979 | Howe . |
| 4,314,705 * | 2/1982 | Shimizu ................................ 277/346 |
| 4,343,591 | 8/1982 | Hannan, III et al. ............. 415/169 R |
| 4,396,197 * | 8/1983 | Shimizu ................................ 277/346 |
| 4,486,024 * | 12/1984 | Cooper ................................... 277/422 |
| 4,500,096 | 2/1985 | Tuttle et al. ............................. 277/53 |
| 4,627,795 | 12/1986 | Schmitz-Montz ..................... 417/267 |
| 4,721,313 | 1/1988 | Pennink .................................. 277/53 |
| 4,961,260 | 10/1990 | Ferri et al. ........................ 29/888.025 |
| 4,993,917 | 2/1991 | Kulle et al. ........................... 415/105 |
| 5,087,172 | 2/1992 | Ferri et al. ............................ 415/230 |
| 5,215,047 * | 6/1993 | Neutgens .......................... 123/90.37 |
| 5,348,456 | 9/1994 | Kun et al. ............................... 418/95 |
| 5,382,141 | 1/1995 | Stinessen .......................... 417/423.8 |
| 5,503,523 | 4/1996 | Prumper ............................ 415/168.2 |
| 5,662,171 * | 9/1997 | Brugman et al. ..................... 166/383 |
| 5,913,812 * | 6/1999 | Smith et al. ............................. 60/657 |

* cited by examiner

*Primary Examiner*—Anthony Knight
*Assistant Examiner*—Alison K. Pickard
(74) *Attorney, Agent, or Firm*—Heslin & Rothenberg, P.C.

(57) ABSTRACT

A labyrinth cartridge seal having a shell and a plurality of sleeves having corresponding portions to prevent axial and radial movement therebetween and particularly a labyrinth cartridge seal for use in a compressor for compression of a gas, such as oxygen, which restricts leakage of pressurized gas to a drive mechanism such as an oil lubricated gear box, to thereby reduce the likelihood of explosions. In one embodiment, the labyrinth cartridge seal includes a shell comprising a passageway therethrough, and four spaced-apart, concentrically aligned sleeves, axially and radially supportable along the passageway and generally sealable with the shell to define three separate chambers around the shaft. The shell has three ports, each one opening onto a different one of the three separate chambers for venting or receiving a supply of buffering gas. Also disclosed is a compressor incorporating such a labyrinth cartridge seal.

20 Claims, 4 Drawing Sheets

US 6,273,429 B1

LABYRINTH CARTRIDGE SEAL, AND CENTRIFUGAL COMPRESSOR APPLICATIONS THEREOF

TECHNICAL FIELD

The present invention generally relates to cartridge seals. More particularly, the present invention relates to labyrinth cartridge seals having a shell and a plurality of sleeves which are correspondingly shaped to prevent radial and axial movement therebetween.

BACKGROUND OF THE INVENTION

In an integrally geared centrifugal compressor, pressurized gas tends to leak axially along the rotating shaft of the compressor and into the driving mechanism such as an oil lubricated gear box. Cartridge seals provide safe operation of the compressor by properly sealing, venting, or buffering the pressurized gas from the oil lubricated gear box. In compressors for compressing gas such as oxygen, oil used for lubricating the gear box must be isolated from the oxygen to prevent fires.

FIG. 1 illustrates a prior art cartridge seal 10 which comprises a bronze shell 12 having a single, elongated, silver sleeve 14 disposed therein. Sleeve 14 is provided with a plurality of ports extending through both shell 12 and sleeve 14 and opening onto the inner surface of sleeve 14 for venting or providing a buffering gas between sleeve 14 and a shaft of a compressor (not shown). During manufacture, a semi-finished silver sleeve 14 is installed into a semi-finished shell 12 and the various ports are drilled through shell 12 and sleeve 14 while assembled together to ensure proper alignment. The inner bore is finished to its required diameter ensuring proper concentricity with the outer diameter of the cartridge. The cartridge seal is then disassembled, deburred, and cleaned prior to final installation into a compressor.

The illustrated prior art cartridge seal 10 while suitable for its intended purpose includes a number of drawbacks. The fabrication of cartridge seal 10 is labor and time intensive due to the required drilling and deburring of the ports. In addition, increasing the number of ports to increase the flow areas between the shaft of the compressor and sleeve for venting or providing a buffering gas reduces the strength of the sleeve and/or shell.

U.S. Pat. No. 4,343,591 to Hannan, III et al. discloses a turbomachine seal system having first and second seal members spaced axially about the shaft of the turbomachine to define therebetween a first annular chamber. Shims are required for positioning the seals axially and radially about the shaft.

U.S. Pat. No. 4,500,096 to Tuttle et al. discloses a turbine shaft seal assembly having three split seals with axial portions or dowel pins which abut each other or which require spacer rings to axially position the seals relative to each other. A gland exhaust opening is provided in the turbine case between the first and second split rings, and a gland exhaust opening is provided in the turbine case between the second split seal and the third split seal.

A drawback of the above disclosed seal assemblies having multiple seals is that they require separately configured elements for positioning the seals axially and/or radially about the shaft of the turbine. In addition, the seal elements are typically fabricated entirely from materials best suited to the gases, e.g., expensive metals or metal alloys. Furthermore, the seal elements typically require excess material in order to properly position the seal which also increases the overall cost.

Therefore, there is a need for labyrinth cartridge seals comprising a shell and a plurality of sleeves using a minimum amount of sealing material and having corresponding portions to prevent axial and radial movement therebetween, which reduce the labor, time, material, and/or cost required for fabrication, and which provide increased areas for venting or receiving a buffering gas to isolate a gas being compressed from the drive mechanism of the compressor.

SUMMARY OF THE INVENTION

Pursuant to the present invention, the shortcomings of the prior art are overcome and additional advantages provided by a labyrinth cartridge seal having a shell and a plurality of sleeves having corresponding portions to prevent axial and radial movement therebetween. The sleeves can be fabricated from various materials suitable to sealing a variety of gases while minimizing the amount of material used. Such a labyrinth cartridge seal is particularly suitable for use in an oxygen compressor which requires costly seal materials in order to restrict the leakage of the pressurized oxygen to a drive mechanism, such as an oil lubricated gear box, to thereby reduce the likelihood of fires.

In one embodiment of the present invention, a labyrinth cartridge seal includes a shell having a passageway through the shell and a least one port opening onto said passageway, and at least two sleeves each of which has an inner surface along which a shaft of a compressor can be positioned. Each of the sleeves and the shell have corresponding portions which complementarily engage each other to radially, and axially support the sleeves in fixed, spaced-apart positions along the passageway to define a chamber around the shaft with the port opening into said chamber. Increased flow areas between the sleeves can be made by cutting annular grooves in the shell to increase the size of chambers 42, 44, and 46.

The shell may include at least two, spaced-apart, inwardly extending annular portions which define a portion of the passageway. The sleeves may each include at least two outwardly extending spaced-apart, annular-shaped portions between which one of the inwardly extending annular-shaped portions of the shell is received. Desirably, the shell comprises a first half and a releasably attachable second half, and the sleeves comprise unitary sleeves.

In another embodiment of the present invention, a labyrinth cartridge seal includes a shell comprising a passageway therethrough, and four spaced-apart, concentrically aligned sleeves, axially and radially supportable along the passageway and generally sealable with the shell to define three separate chambers around the shaft. The shell has three ports, each one opening into a different one of the three separate chambers.

Another embodiment of the present invention relates to a compressor for pressurizing a gas, in which the compressor comprises a shaft, a drive mechanism attached to a first end portion of the shaft for rotating the shaft, an impeller attached to a second end portion of the shaft for pressurizing the gas, and a casing for supporting the shaft and the drive mechanism. A labyrinth cartridge seal as described above is disposed between the shaft and the casing for restricting the flow of pressurized gas along the shaft toward the drive mechanism.

One of the ports may be operably connected to return pressurized gas to the inlet of the impeller, one of the ports may be operably connected to vent the chamber to the atmosphere, and one of the ports may be operably connected to receive a buffering gas.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention will be readily understood from the following detailed description of the preferred embodiments taken in conjunction with the accompanying drawings in which:

DETAILED DESCRIPTION OF THE PREFERRED EMBODIMENT(S)

Figure 1:
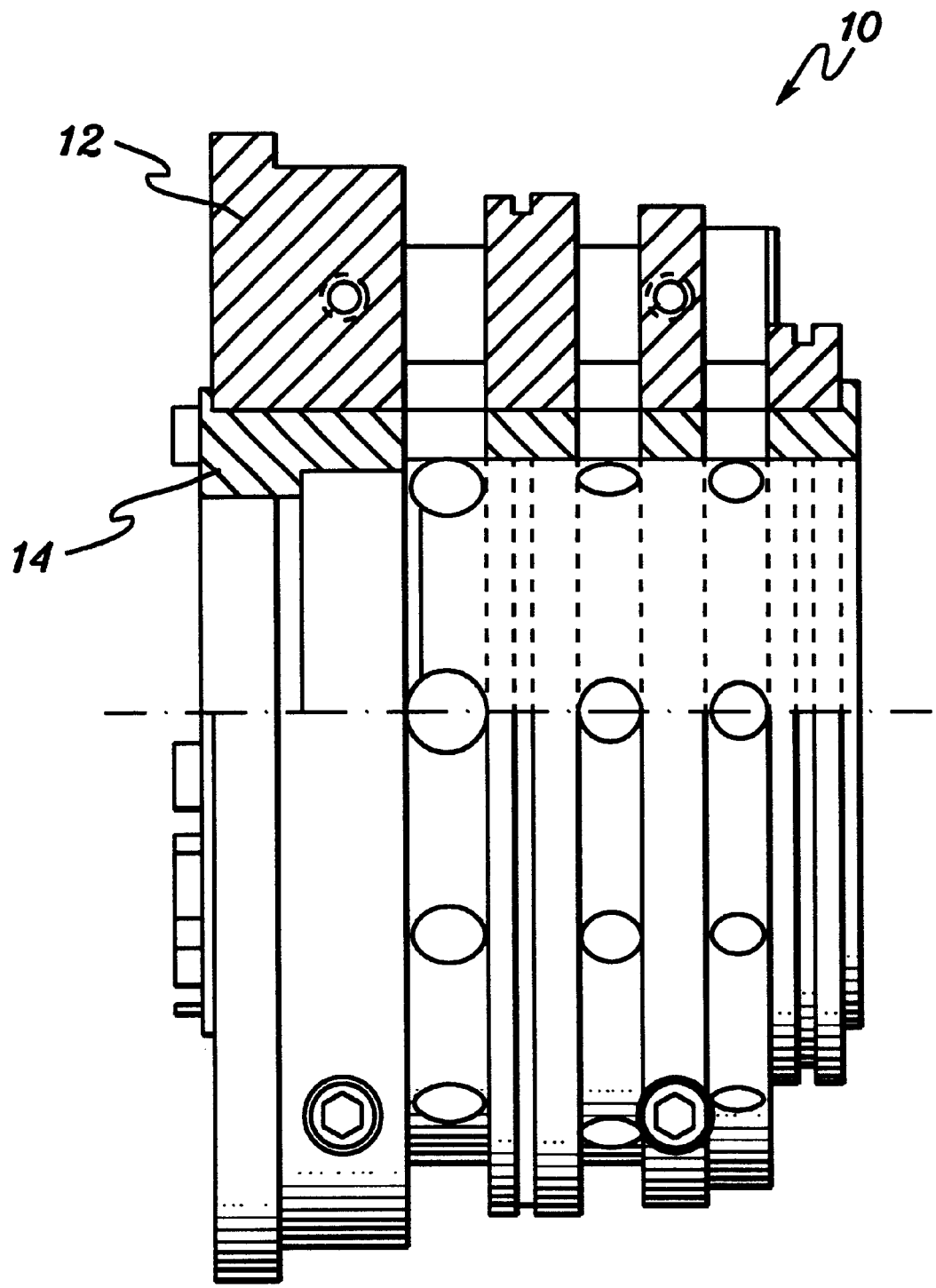
FIG. 1 is a side elevational view, in part cross-section, of a prior art cartridge seal.
Figure 2:
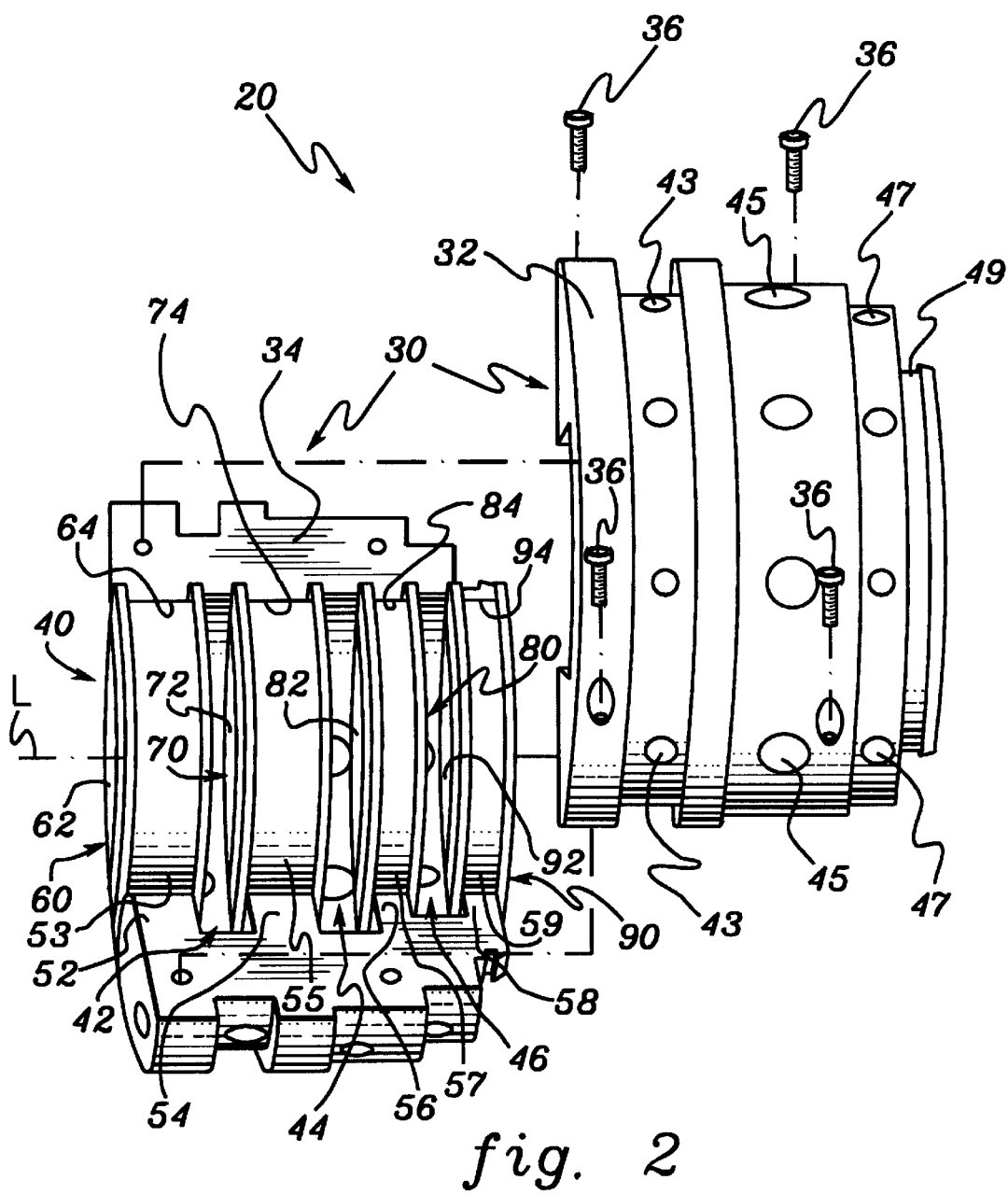
FIG. 2 an exploded perspective view of a labyrinth cartridge seal according to the present invention.
Figure 3:
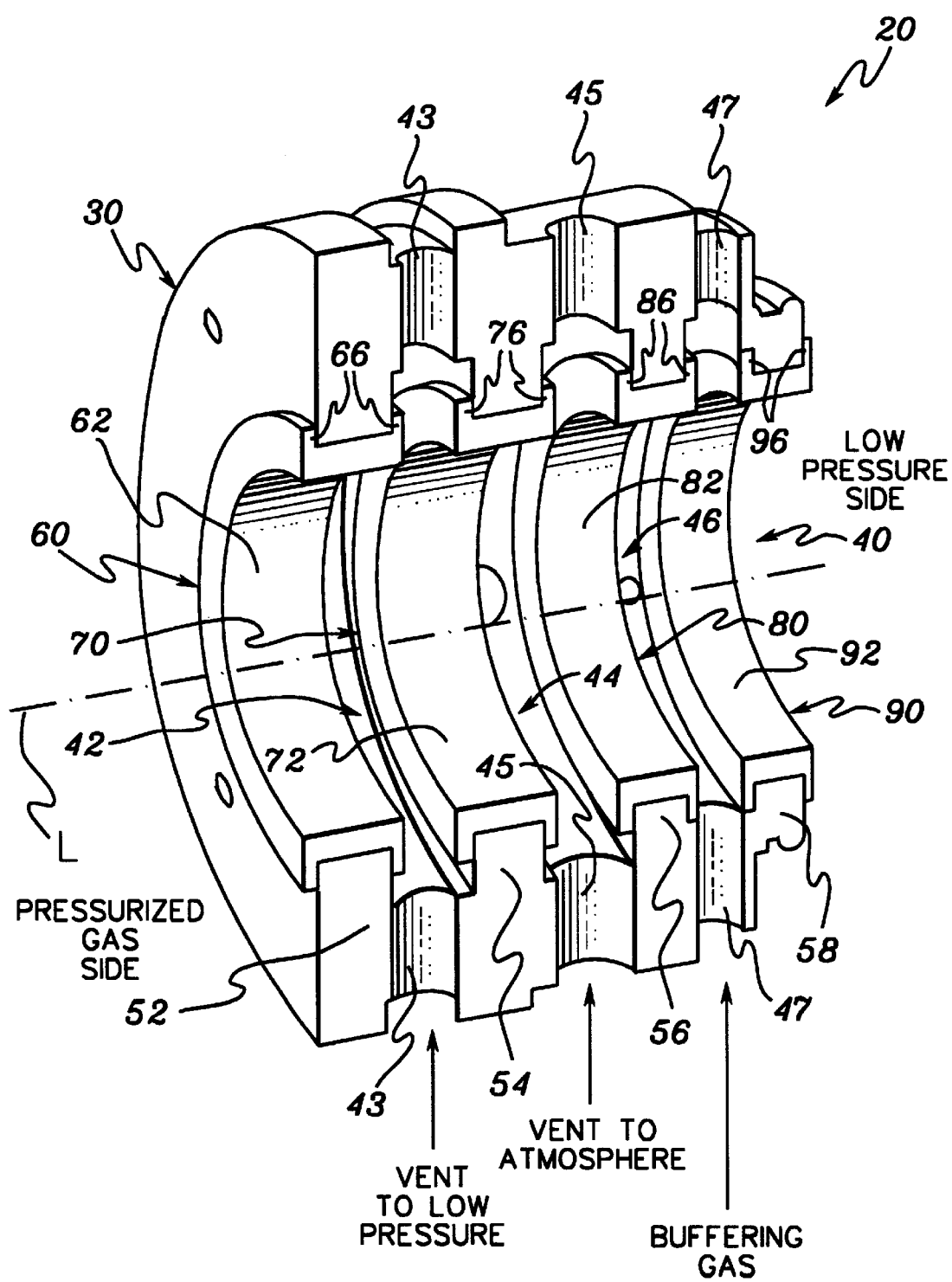
FIG. 3 is a perspective view, in part cross-section, of the labyrinth cartridge seal shown in FIG. 2.
Figure 4:
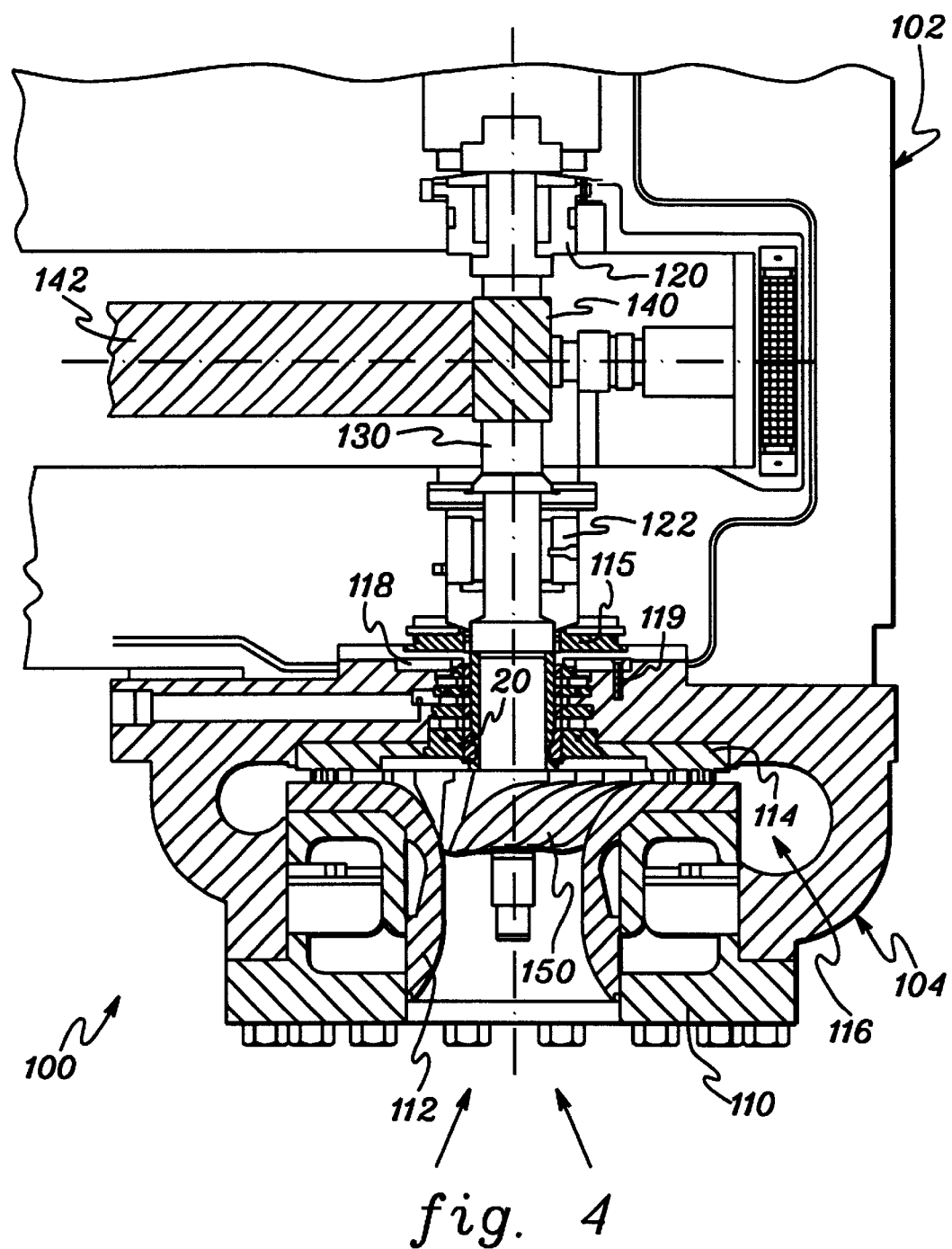
FIG. 4 is a cross-sectional view of a compressor including the labyrinth cartridge seal shown in FIG. 2.

With reference to FIGS. 2–4, one embodiment of a labyrinth cartridge seal 20 is shown, in accordance with the principles of the present invention, for use in a compressor 100 (FIG. 4). The novel labyrinth cartridge seal 20 includes a shell and a plurality of sleeves having corresponding portions to prevent axial and radial movement therebetween. This novel configuration also reduces the labor, time, and/or cost required for fabrication of the labyrinth cartridge seal. In addition, labyrinth cartridge seal 20 is suitable for use in a compressor for compression of a gas, such as oxygen, by restricting leakage of pressurized gas along the shaft to a drive mechanism, such as an oil lubricated gear box, to thereby reduce the likelihood of fires.

As shown in FIG. 4, compressor 100 may include a casing 102, only part of which is shown, in which a high speed journal/thrust bearing 120 and a high speed journal bearing 122 rotatably support a shaft 130. Mounted on shaft 130 and disposed between bearings 120 and 122 is a pinion gear 140 which is operably driven by drive gear 142.

An impeller 150 is mounted to an end portion of shaft 130 which extends into a housing 104. Housing 104 comprises an entry flange 110, a shroud 112, and a diffuser 114 which together surround impeller 150.

Disposed between casing 102 and housing 104 and encircling shaft 130 is labyrinth cartridge seal 20 for restricting pressurized gas in housing 104 from leaking into casing 102. In addition, a retaining seal plate 118 and seal retaining screws 119 may operably secure labyrinth cartridge seal 20 in compressor 100. A buffered oil seal 115 may further be disposed between bearing 122 and retaining seal plate 118.

In operation, compressor 100 delivers pressurized gas, e.g., pressurized gaseous oxygen, by rotating impeller 150 at a high speed. The gas enters compressor 100 through entry flange 110 and shroud 112. Rotating impeller 150 compresses and delivers the pressurized gas to diffuser 114 which increases the static pressure prior to discharge into a chamber 116 of housing 104. As explained in greater detail below, labyrinth cartridge seal 20 provides gas recovery, buffering, and/or venting for restricting pressurized gas from leaking along shaft 130 from housing 104 to casing 102.

As best shown in FIG. 2, exemplary labyrinth cartridge seal 20 includes a shell 30 and four unitary sleeves 60, 70, 80, and 90. Shell 30 comprises a first C-shaped half 32 and a second C-shaped half 34. Halves 32 and 34 are readily assembled and disassembled with a plurality of bolts 36. With halves 32 and 34 assembled together shell 30 comprises an inner surface defining a passageway 40 having an axis L. Each of half 32 and 34 comprise puller holes 38 (FIG. 3) so that labyrinth cartridge seal 20 can be readily removed from the compressor for maintenance or replacement. An O-ring (not shown) is suitably positioned within a groove 49 which is disposed around the outer circumferential surface of shell 30 to seal labyrinth seal 20 to casing 102.

Sleeves 60, 70, 80, and 90 comprise inner cylindrical surfaces 62, 72, 82, and 92 through which shaft 130 (FIG. 4) is receivable. Each of the sleeves and the inner surface of shell 30 comprise cooperating portions which matingly engage each other to generally sealably, radially, and axially support the sleeves in fixed, spaced-apart, concentrically aligned, positions along passageway 40. Sleeves 60, 70, 80, and 90 and shell 30 define three separate flow areas or chambers 42, 44, and 46 which extend completely around the circumference of shaft 130 (FIG. 4).

With reference to FIGS. 2 and 3, shell 30 includes a plurality of ports which open onto passageway 40 for gas recovery, buffering, and/or venting of the three separate chambers. In this illustrated embodiment, shell 30 comprises radially extending ports 43, 45, and 47 which open onto passageway 40 and into chambers 42, 44, and 46, respectively. The size and number of ports may be the same or different for each annular space depending on the particular application, e.g., larger sized ports for venting and smaller sized ports for receiving a buffering gas.

Shell 30 may comprise a generally hollow cylindrical configuration having a plurality of inwardly extending, spaced-apart, portions for supporting sleeves 60, 70, 80, and 90. For example, shell 30 may comprise four annular-shaped portions 52, 54, 56, and 58 which extend around passageway 40. Sleeves 60, 70, 80, and 90 may comprise outer cylindrical surfaces 53, 55, 57, and 59 (FIG. 2), respectively, which are dimemsioned to be received on inwardly extending surfaces 64, 74, 84, and 94 (FIG. 2) of shell 30 to restrain the sleeves radially within shell 30. Each of sleeves 60, 70, 80, and 90 include two outwardly extending portions or stops 66, 76, 86, and 96 (FIG. 3) respectively, which straddle the inwardly extending portions of shell 30 to restrain the sleeves axially within shell 30. Increased flow areas between the sleeves can be made by cutting annular grooves in the shell to increase the size of chambers 42, 49, and 46.

In one preferred embodiment of the labyrinth cartridge seal for use in oxygen service, the shell is fabricated from bronze and the sleeves are fabricated from silver. Silver sleeves reduce the chances of ignition should contact occur between the sleeves and the rotating shaft of the compressor. Bronze is desirable for the shell because of its non-sparking properties and high thermal conductivity to conduct away the heat generated during contact between the rotating shaft and one or more of the silver sleeves.

In addition, each sleeve of labyrinth cartridge seal 20 provides a restriction to restrict pressurized oxygen gas from leaking around the shaft toward the drive mechanism and also to provide a restriction to gas contained in each of the chambers between the sleeves. In oxygen service, sleeve 60, which is disposed closest to the pressurized oxygen gas, provides a restriction between recovery ports 43 which are operably connected to return leaking oxygen back to the inlet of the compressor or to another location of low pressure point.

Sleeve 70, spaced-apart from sleeve 60, provides a restriction between ports 45 which are in fluid communication with an atmospheric vent and recovery ports 43. When compressing oxygen this allows for a safe release of oxygen gas from the system. As illustrated in FIG. 3 ports 45 are sized larger than ports 43 and 47. Advantageously, a large area is used to limit velocities of the flowing oxygen which reduces the likelihood of igniting the materials.

Sleeve 80, spaced-apart from sleeve 70, provides a restriction between a nitrogen buffer gas receivable via ports 47 and the atmospheric vent. This section minimizes the amount of nitrogen gas required and further prevents oxygen from entering into the casing of the compressor containing the oil lubricated gear box.

Sleeve 90, furthest away from the pressurized oxygen gas provides a restriction between the nitrogen buffer and the gearbox which is vented to the atmosphere. The buffer flow of nitrogen gas towards the gearbox vent restricts oil and oil vapors from coming into contact with oxygen gas.

In this illustrated embodiment, labyrinth cartridge seal 20 creates a barrier that safely isolates the high pressure region of the compressor from a region of lower pressure. In addition, in this illustrated design, oxygen gas which flows past seal 70 and nitrogen gas which flows past seal 80 are both discharged into the atmosphere via ports 45.

The design of the illustrated cartridge seal may be readily and inexpensively manufactured. For example, the silver sleeve may be machined on a high-speed, precision, NC lathe. The bronze shell can also be machined on a high-speed, precision, NC lathe and holes or ports subsequently drilled through the shell. The use of multiple sleeves allows for increased flow areas around the shaft without requiring slots to be milled into the sleeves. This configuration eliminates the need for deburring holes in the sleeves and the set-up required for final machining of the sleeve bore. The novel configuration of the cartridge reduces the amount of material required for the sleeves and allows for cost effective replacement of one or more damaged sleeves. In addition, the labyrinth cartridge seal of the present invention is also readily assembled and disassembled for cleaning and/or inspection.

Although the present invention is described in detail with reference to use in a compressor, it will be appreciated by those skilled in the art that the labyrinth cartridge seal may be effectively utilized in turbines and/or in devices for compressing gases other than oxygen, e.g., for limiting contamination of pressurized gas with oil. In addition, the labyrinth cartridge seal may be used in compressors having one or more compression stages, e.g., compressors having a first impeller attached to one ends of a rotatable shaft and a second impeller attached to the other end of the rotatable shaft.

While several aspects of the present invention have been described and depicted herein, alternative aspects may be effected by those skilled in the art to accomplish the same objectives. Accordingly, it is intended by the appended claims to cover all such alternative aspects as fall within the true spirit and scope of the invention.

What is claimed is:

1. A labyrinth cartridge seal for use in a compressor having a rotatable shaft, said labyrinth cartridge seal comprising:

a shell comprising a passageway through said shell and a least one port opening onto said passageway;

at least two sleeves, each comprising an inner surface through which the shaft is positionable, each of said sleeves and said shell comprising corresponding portions which engage each other to generally sealably, and radially and axially fixedly support said sleeves in spaced-apart positions along said passageway to define a chamber around the shaft with said port opening into said chamber; and wherein each of said at least two sleeves comprises one-piece.

2. The labyrinth cartridge seal according to claim 1, wherein said shell comprises at least two, spaced-apart, inwardly extending portions which define a portion of said passageway.

3. The labyrinth cartridge seal according to claim 2, wherein each of said sleeves comprise at least two outwardly extending spaced-apart portions between which one of said inwardly extending portions of said shell is receivable.

4. The labyrinth cartridge seal according to claim 1, wherein said shell comprises at least two spaced-apart annular-shaped portions which define a portion of said passageway.

5. The labyrinth cartridge seal according to claim 4, wherein each of said sleeves comprise at least two outwardly extending, spaced-apart, annular-shaped portions.

6. The labyrinth cartridge seal according to claim 1, wherein said at least two sleeves comprises a multiplicity of sleeves supported in said passageway to define separate chambers around the shaft with at least one port opening into each of said chambers.

7. The labyrinth cartridge seal according to claim 1, wherein said shell comprises a first half and a releasably attachable second half.

8. A compressor for pressurizing a gas, said compressor comprising:

a shaft;

a drive mechanism attached to a first end portion of said shaft for rotating said shaft;

an impeller attached to a second end portion of said shaft for pressurizing the gas; and a labyrinth cartridge seal according to claim 1 disposed around said shaft and between said drive mechanism and said impeller for inhibiting the flow of pressurized gas toward said drive mechanism.

9. A labyrinth cartridge seal for use in a compressor having a rotatable shaft, said labyrinth cartridge seal comprising:

a shell comprising a passageway therethrough;

four spaced-apart, concentrically aligned sleeves, axially and radially fixedly supportable along said passageway and generally sealable with said shell to define three separate chambers around the shaft;

said shell having three ports each one opening into a different one of said three separate chambers; and wherein each of said sleeves comprises one-piece.

10. The labyrinth cartridge seal according to claim 9, wherein said shell and each of said sleeves comprise corresponding portions which matingly engage each other.

11. The labyrinth cartridge seal according to claim 10, wherein said sleeves comprise silver.

12. The labyrinth cartridge seal according to claim 10, wherein said shell comprises bronze.

13. The labyrinth cartridge seal according to claim 9, wherein said shell comprises three axially spaced-apart, inwardly extending, portions which define a portion of said passageway and each of said sleeves comprise at least two outwardly extending spaced-apart portions between which one of said inwardly extending portions is receivable.

14. A compressor for pressurizing a gas, said compressor comprising:

a shaft;

a drive mechanism attached to a first end portion of said shaft for rotating said shaft;

an impeller attached to a second end portion of said shaft for pressurizing the gas; and a labyrinth cartridge seal disposed around said shaft and between said drive mechanism and said impeller for inhibiting the flow of pressurized gas toward said drive mechanism, said labyrinth cartridge seal comprising a shell comprising a passageway therethrough, and four spaced-apart, concentrically aligned, sleeves axially and radially fixedly supportable along said passageway and generally sealable with said shell to define three separate axially spaced-apart chambers around said shaft, said shell having three ports each one opening onto a different one of said three separate chambers, and said shell being axially and radially fixedly disposed about said shaft.

15. The compressor according to claim 14, wherein one of said ports is operably connected to return pressurized gas to said impeller.

16. The compressor according to claim 15, wherein one of said ports is operably connected to vent said chamber to the atmosphere.

17. The compressor according to claim 16, wherein one of said ports is operably connected to receive a buffering gas.

18. A cartridge seal for use in a compressor having a rotatable shaft, said cartridge seal comprising:

a shell comprising a passageway through said shell and a least one port opening onto said passageway;

at least two, one-piece, spaced-apart, concentrically aligned sleeves axially and radially fixedly supportable along said passageway and generally sealable with said shell to define a chamber around the shaft with said port opening into said chamber; and wherein said shell comprises at least two, spaced-apart, inwardly extending portions which define a portion of said passageway, and wherein each of said sleeves comprise at least two outwardly extending spaced-apart portions between which one of said inwardly extending portions of said shell is receivable.

19. A compressor for pressurizing a gas, said compressor comprising:

a shaft;

a drive mechanism attached to a first end portion of said shaft for rotating said shaft;

an impeller attached to a second end portion of said shaft for pressurizing the gas; and a labyrinth cartridge seal comprising a shell comprising a passageway therethrough, and at least two spaced-apart, concentrically aligned, sleeves axially and radially fixedly supportable along said passageway and generally sealable with said shell to define a chamber around said shaft, said shell having a port opening into said chamber, and said shell being axially and radially fixedly disposed about said shaft.

20. A labyrinth cartridge seal for use in a compressor having a rotatable shaft, said labyrinth cartridge seal comprising:

a shell comprising a passageway through said shell and a least one port opening onto said passageway;

at least two removable sleeves, each comprising an inner surface through which the shaft is positionable, each of said sleeves and said shell comprising corresponding portions which engage each other to generally sealably, and radially and axially fixedly support said sleeves in spaced-apart positions along said passageway to define a chamber around the shaft wit said port opening into said chamber.

* * * * *

UNITED STATES PATENT AND TRADEMARK OFFICE
CERTIFICATE OF CORRECTION

PATENT NO. : 6,273,429 B1
DATED : August 14, 2001
INVENTOR(S) : Dudinetz et al.

It is certified that error appears in the above-identified patent and that said Letters Patent is hereby corrected as shown below:

Column 4,
Line 38, delete "dimemsioned" and insert -- dimensioned --

Column 8,
Line 35, delete "wit" and insert -- with --

Signed and Sealed this

Thirtieth Day of April, 2002

*Attest:*

JAMES E. ROGAN
*Attesting Officer*   *Director of the United States Patent and Trademark Office*